(12) United States Patent
Kim et al.

(10) Patent No.: US 10,147,945 B2
(45) Date of Patent: Dec. 4, 2018

(54) OLIVINE COMPOSITION WITH IMPROVED CELL PERFORMANCE

(71) Applicants: Umicore, Brussels (BE); Umicore Korea Ltd., Chungnam (KR)

(72) Inventors: DaeHyun Kim, Cheonan (KR); Jens Paulsen, Daejeon (KR); HeonPyo Hong, Cheonan-Si (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 44 days.

(21) Appl. No.: 14/771,237

(22) PCT Filed: Mar. 8, 2013

(86) PCT No.: PCT/IB2013/051846
§ 371 (c)(1),
(2) Date: Aug. 28, 2015

(87) PCT Pub. No.: WO2014/135923
PCT Pub. Date: Sep. 12, 2014

(65) Prior Publication Data
US 2016/0006035 A1   Jan. 7, 2016

(51) Int. Cl.
*H01M 4/58*     (2010.01)
*C01B 25/45*   (2006.01)
(Continued)

(52) U.S. Cl.
CPC .......... *H01M 4/5825* (2013.01); *C01B 25/45* (2013.01); *H01M 10/052* (2013.01);
(Continued)

(58) Field of Classification Search
CPC ................................................ H01M 4/5825
See application file for complete search history.

(56) References Cited

U.S. PATENT DOCUMENTS 5,910,382 A    6/1999  Goodenough et al.
7,285,260 B2  10/2007  Armand et al.
(Continued)

FOREIGN PATENT DOCUMENTS

CN   101508431 A   8/2009
CN   101946346 A   1/2011
(Continued)

OTHER PUBLICATIONS

Yamada, A., et al. "Reaction mechanism of the Olivine-Type $Li_x(Mn_{0.6}Fe_{0.4})PO_4$ (0≤x≤1)", *Journal of the Electrochemical Society*, vol. 148, No. 7, (2001), pp. A747-A754.
(Continued)

*Primary Examiner* — Jonathan Crepeau
(74) *Attorney, Agent, or Firm* — NK Patent Law

(57) ABSTRACT

The invention discloses an olivine cathode material comprising Li, M and $PO_4$, having a non-stoichiometric composition wherein: —the phosphor stoichiometry $PO_4$:[(Li+M)/2] is between 0.940 and 1.020, —the lithium to metal ratio Li:M is between 1.040 and 1.150, and wherein M=$Fe_{x-z'}Mn_x D_{z'}$, with 0.10<x<0.90, z'>0, D being a dopant comprising either one or both of Cr and Mg. In one embodiment $PO_4$:[(Li+M)/2] is between 0.960 and 1.000, resulting in an even better performing material. Performance is improved even more in another embodiment wherein $PO_4$:[(Li+M)/2] is less than 1.000. Improvements in performance are also obtained for either an embodiment wherein the lithium to metal ratio Li:M is between 1.070 and 1.120; or an embodiment wherein the manganese to iron ratio Mn/(Mn+Fe) is between 0.25 and 0.75; or for another embodiment wherein z'<0.05.

11 Claims, 10 Drawing Sheets

(51) Int. Cl.
*H01M 10/052* (2010.01)
*H01M 4/02* (2006.01)
*H01M 10/0525* (2010.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | |
|---|---|---|
| 7,998,617 B2 | 8/2011 | Armand et al. |
| 8,097,362 B2 | 1/2012 | Isono |
| 2009/0186277 A1 | 7/2009 | Beck et al. |
| 2011/0052988 A1 | 3/2011 | Beck et al. |
| 2011/0195304 A1 | 8/2011 | Abe et al. |

FOREIGN PATENT DOCUMENTS

| | | |
|---|---|---|
| CN | 102292855 A | 12/2011 |
| CN | 102569802 A | 7/2012 |
| JP | 2009-286669 A | 12/2009 |
| TW | 523945 | 3/2003 |
| WO | 2013016426 | 1/2013 |
| WO | 2013127251 | 9/2013 |

OTHER PUBLICATIONS

Yamada, A., et al., "Olivine-Type cathodes: Achievements and Problems", *Journal of Power Sources*, vol. 119-121 (2003), pp. 232-238.
International Search Report for PCT/IB2013/051846, dated Nov. 4, 2013.
Taiwan IPP Search Report for Application No. 103107907.
Wang, C., et al., "Ionic/Electronic Conducting Characteristics of LiFePO4 Cathode Materials", Electrochemical and Solid State Letters, vol. 10, No. 3 (2007), pp. A65-A69.
Xu, B., et al., "Recent Progress in Cathode Materials Research for Advanced Lithium Ion Batteries", Materials Science and Engineering, vol. R73 (2012), pp. 51-65.
Chinese Search Report for Application No. 201380074386.4.
European Search Report for EP13876985.6, dated Sep. 16, 2016.
Kim, J., et al., "Mg and Fe Co-doped Mn Based Olivine Cathode Material for High Power Capability", Journal of the Electrochemical Society, vol. 158, No. 3 (Jan. 1, 2011), p. A250.

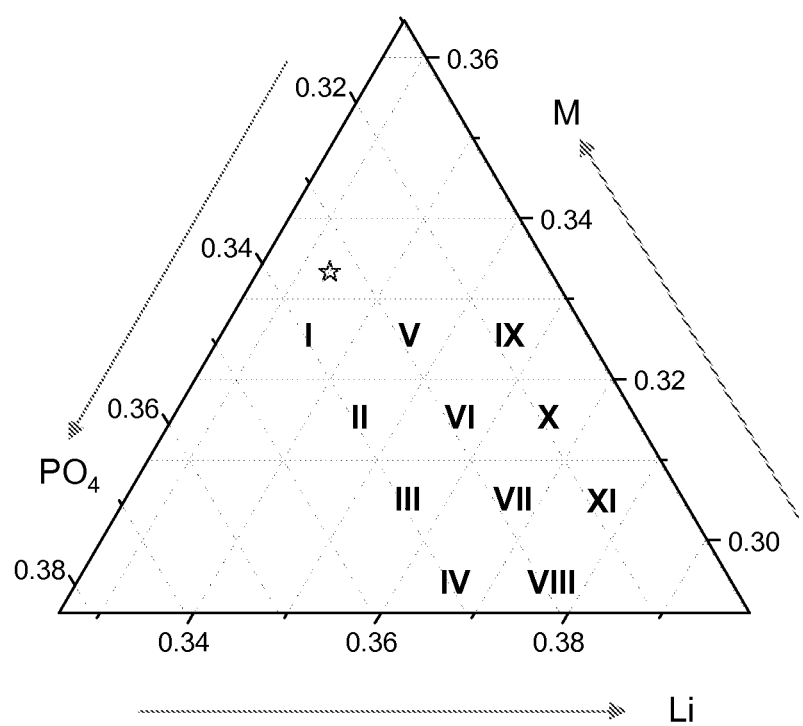
Figure 1.1

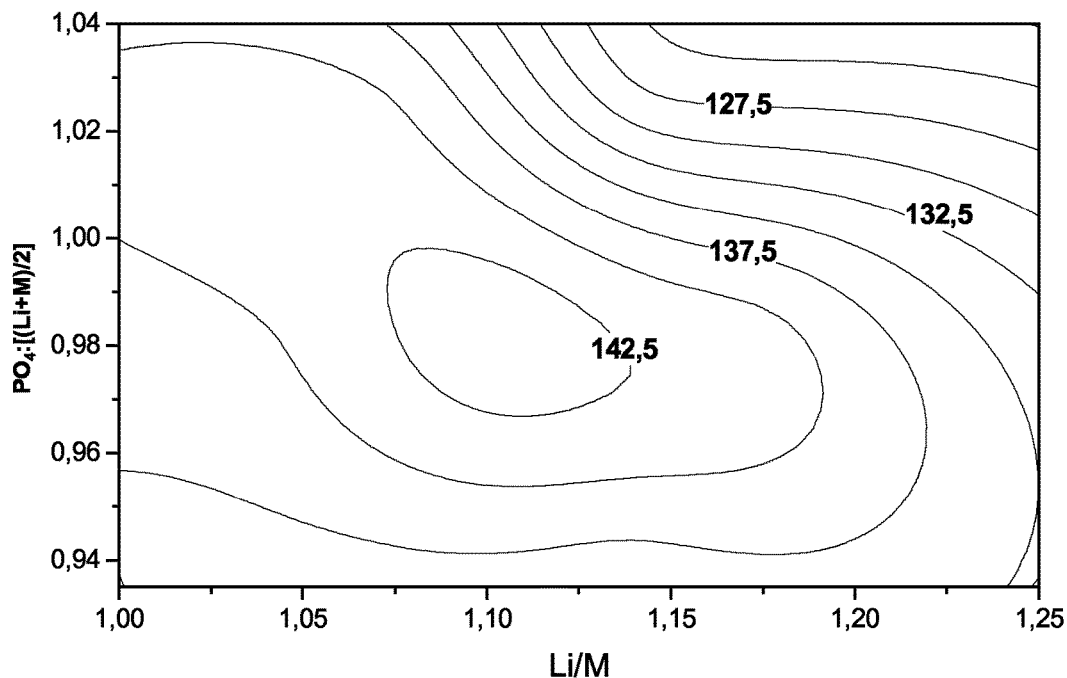
Figure 1.2
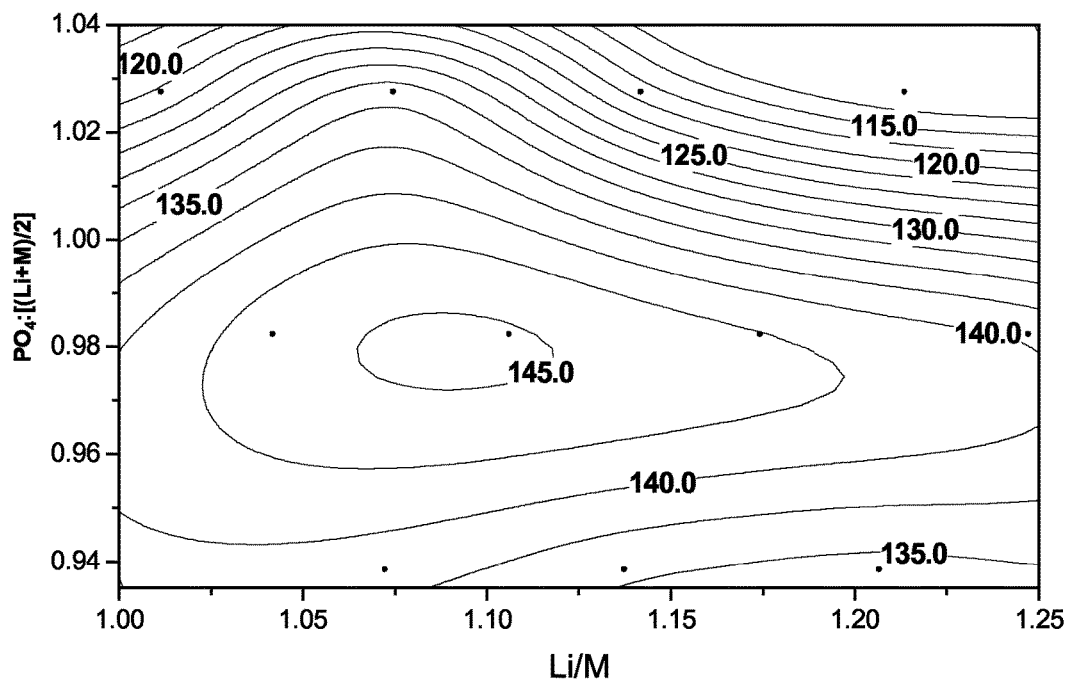
Figure 2.1

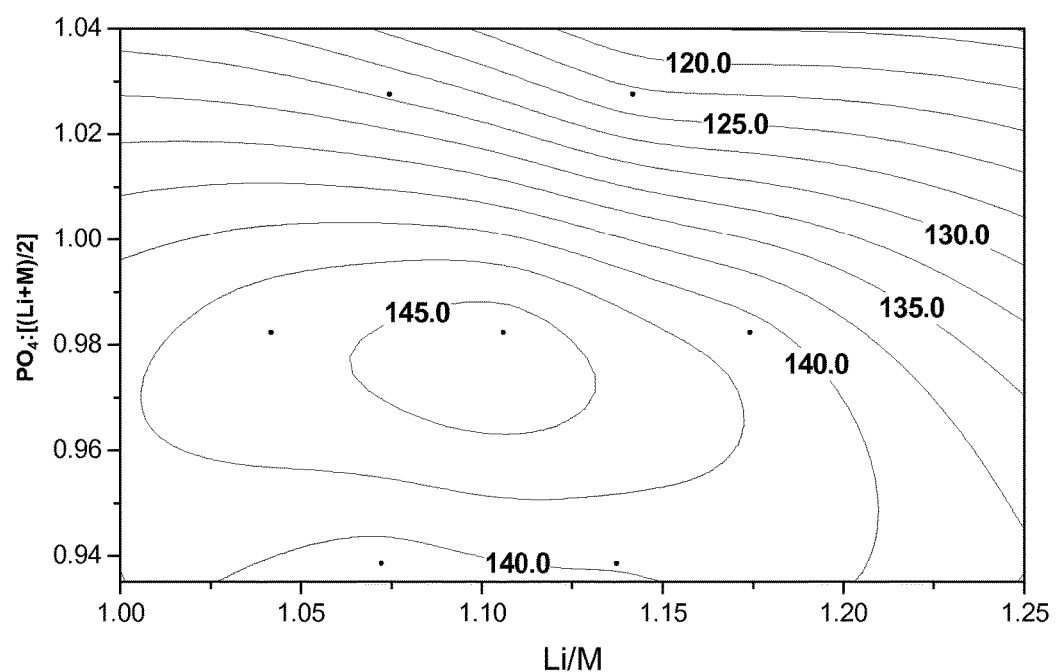
Figure 3.1

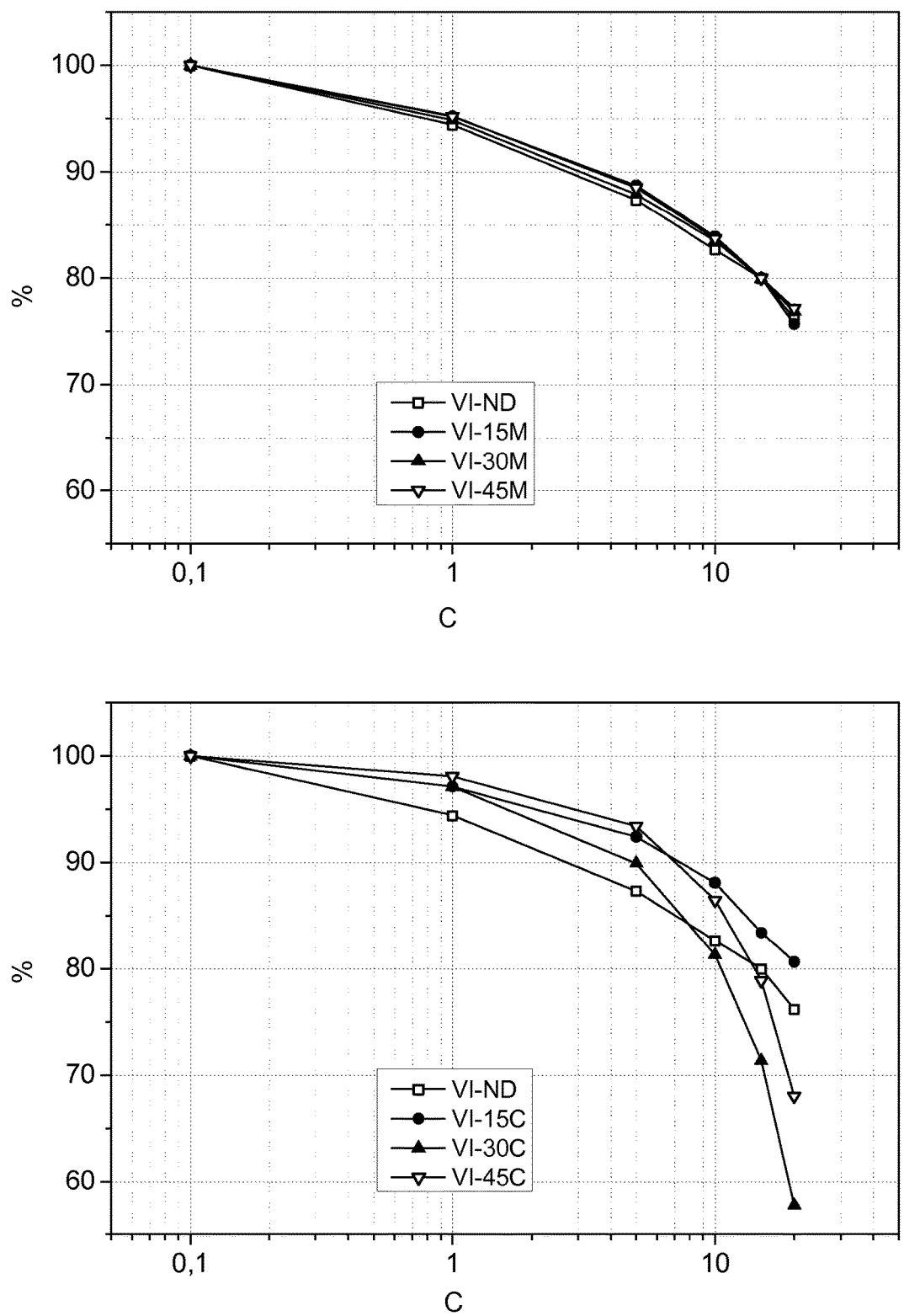
Figure 5.1

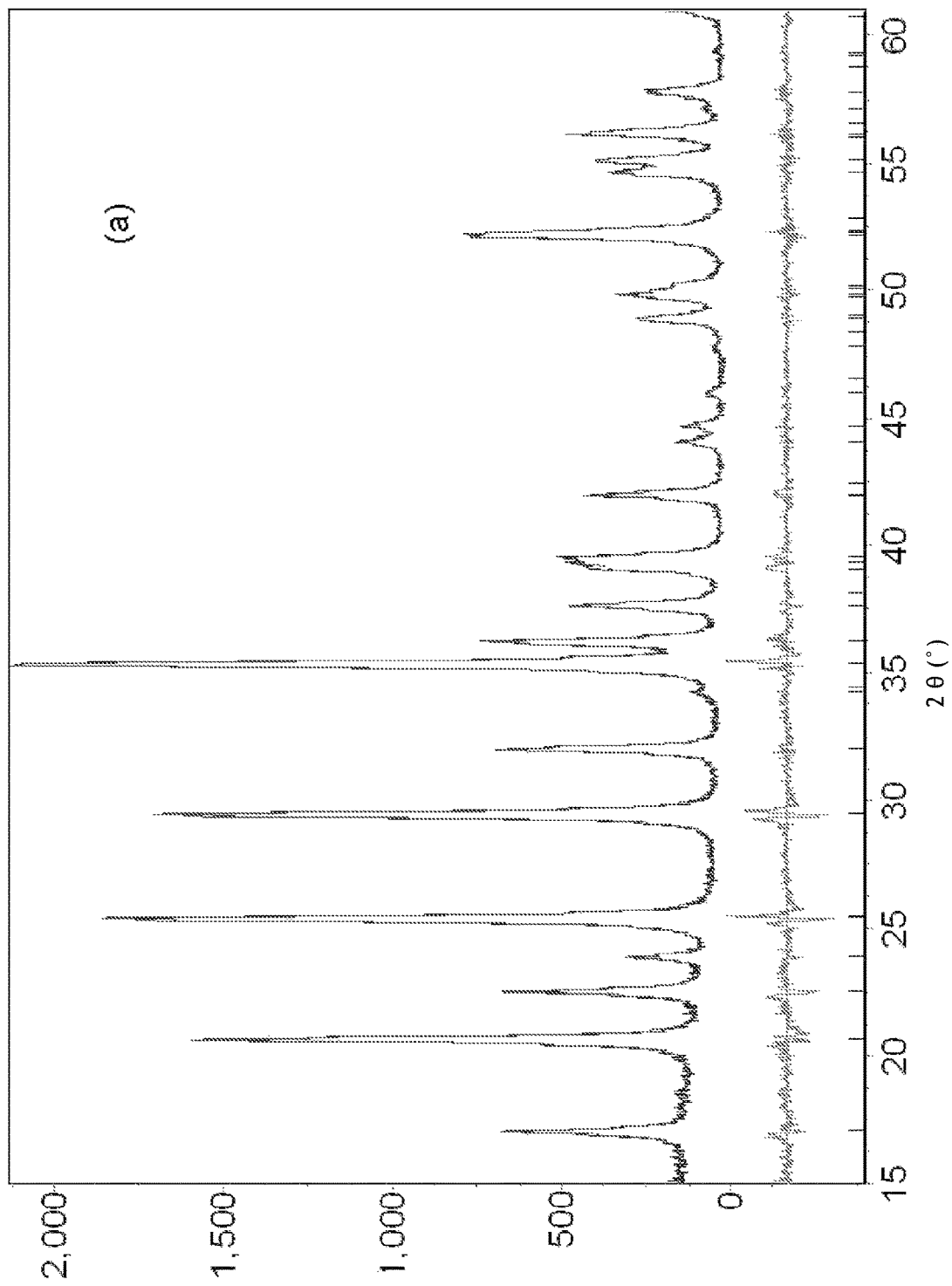
Figure 7.1

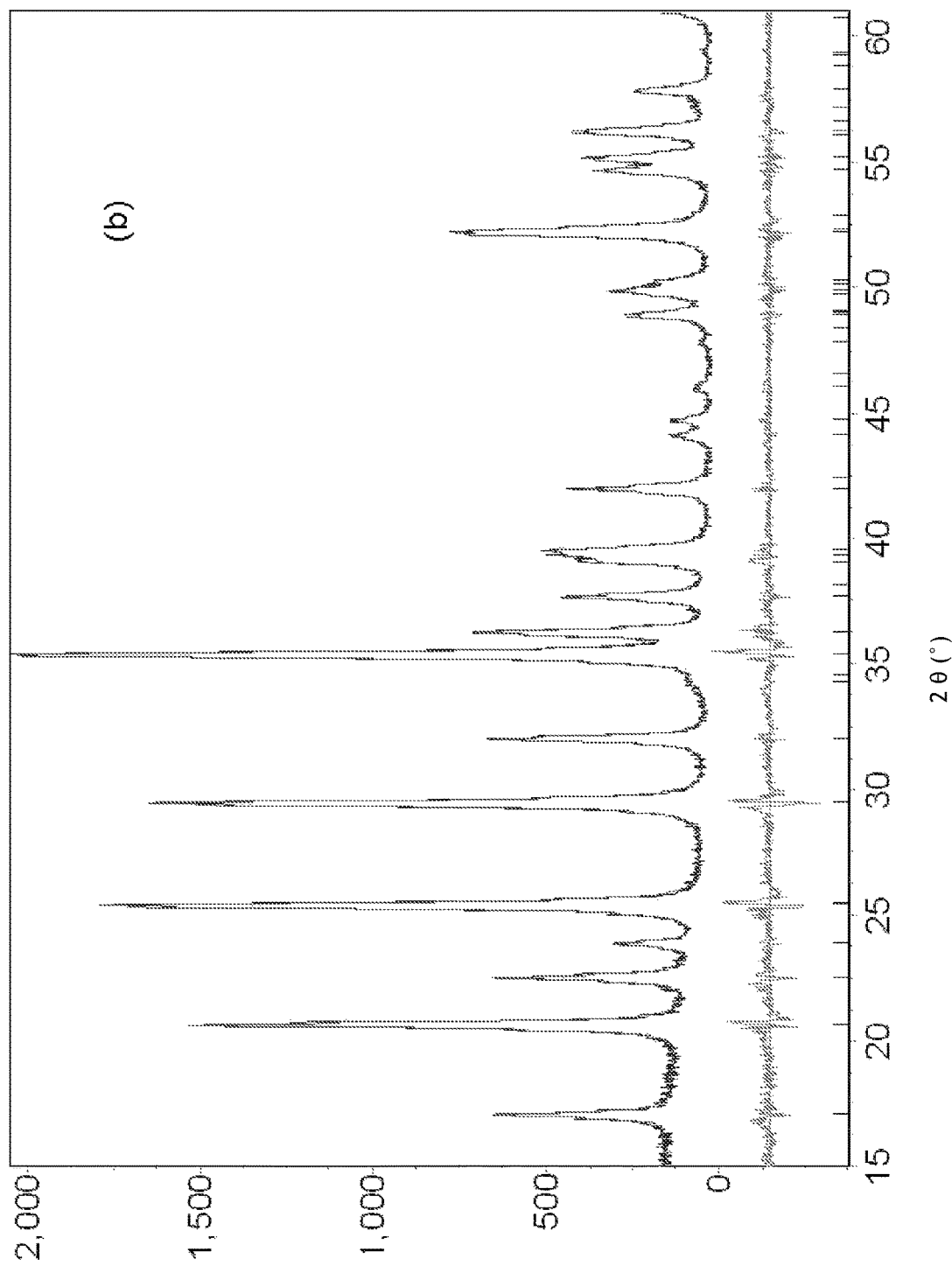
Figure 7.1

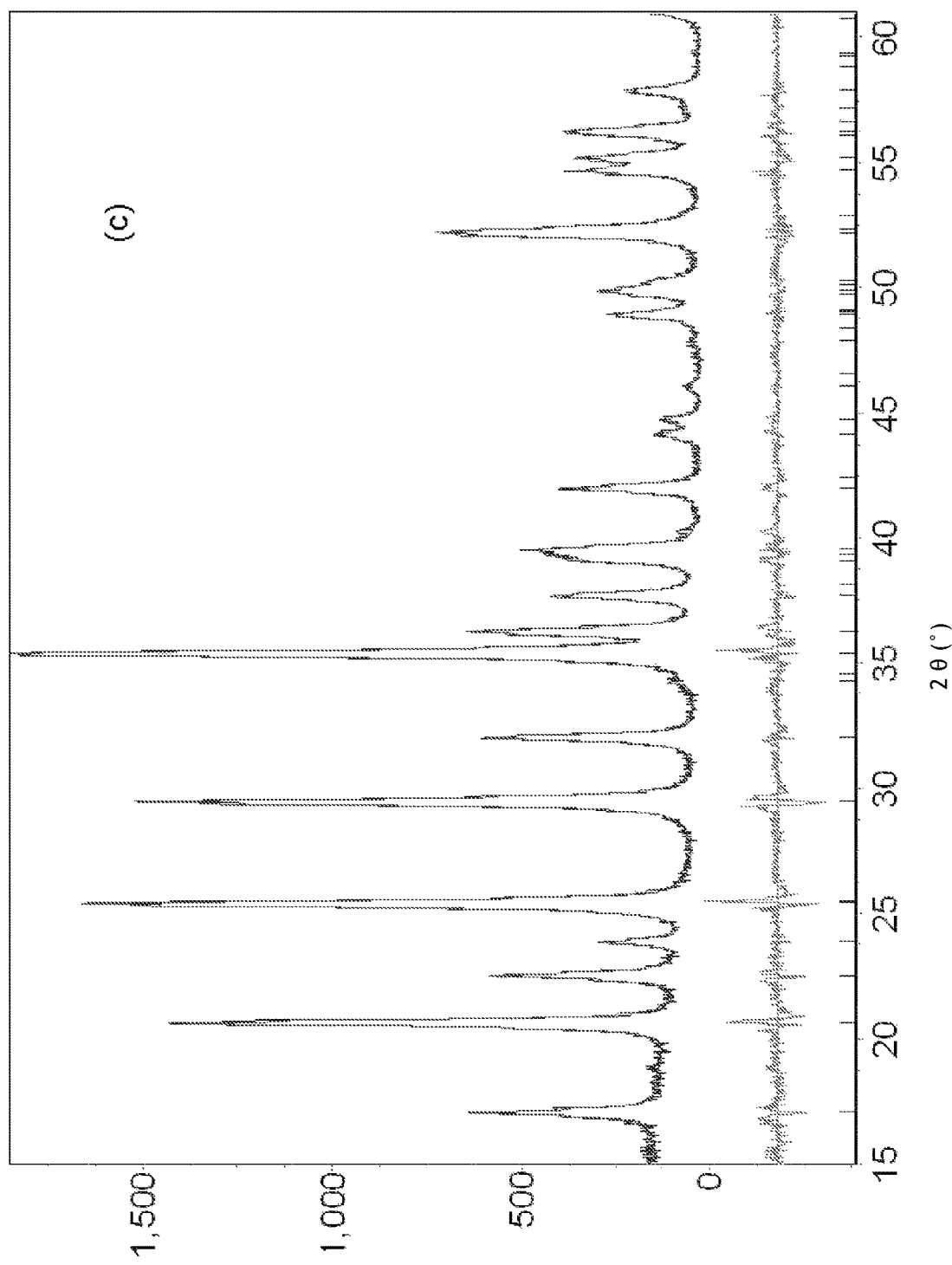
Figure 7.1

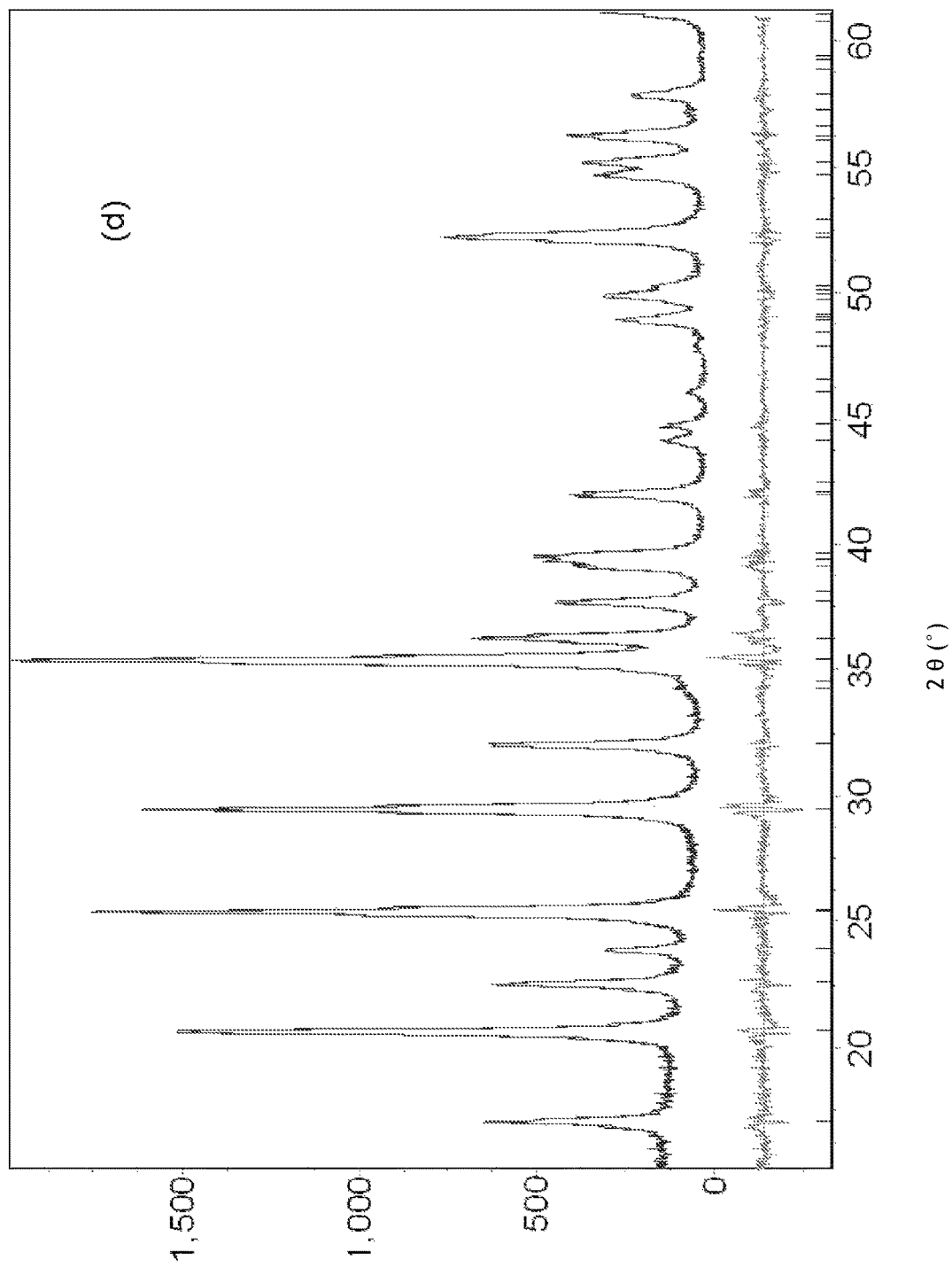
Figure 7.1

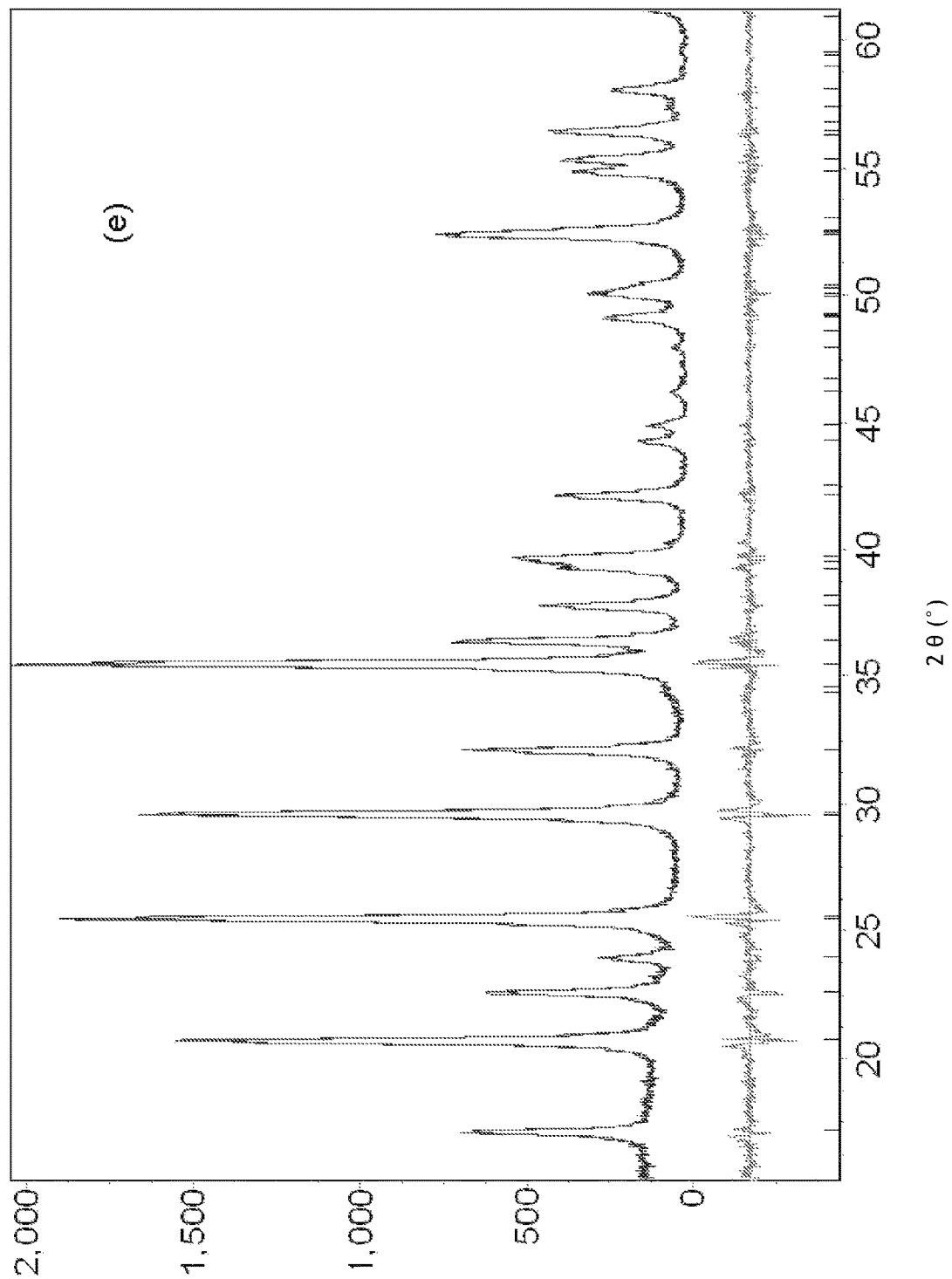
Figure 7.1

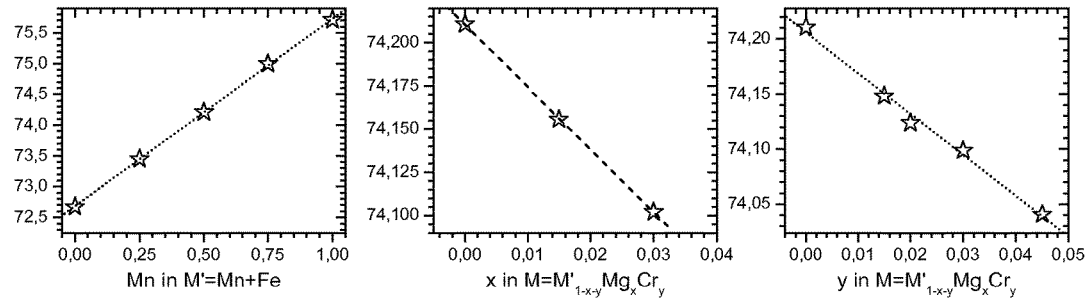
Figure 8.1
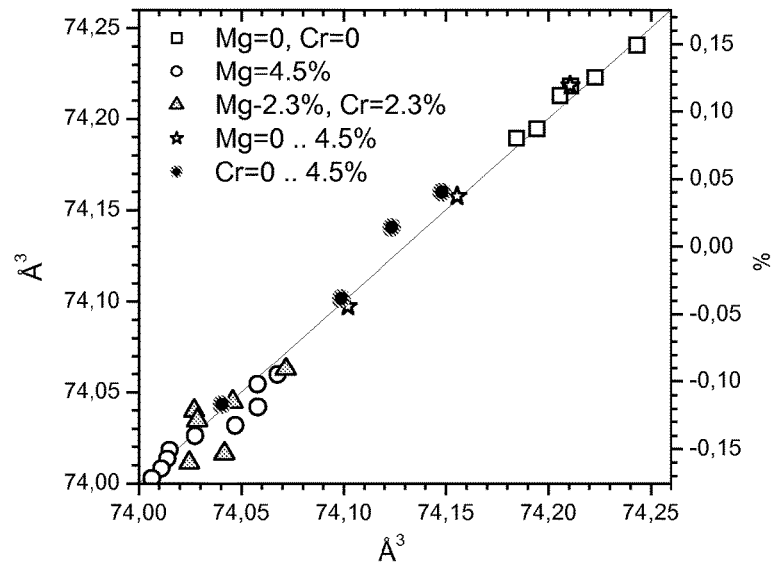
Figure 8.2

OLIVINE COMPOSITION WITH IMPROVED CELL PERFORMANCE

This application is a National Stage application of International Application No. PCT/IB2013/051846, filed Mar. 8, 2013.

TECHNICAL FIELD AND BACKGROUND

The invention relates to phosphate based cathode materials for rechargeable batteries with an olivine structure, more in particular non-stoichiometric doped $LiMPO_4$—$M=Fe_{1-x}Mn_x$-based cathode materials.

Most commercial rechargeable Lithium batteries use LCO as cathode material. In this document LCO stands for $LiCoO_2$ based cathode materials. However LCO has major drawbacks such as limited safety, where charged batteries might become unsafe, ultimately going to thermal runaway which can result in a severe explosion, and high cost of the cobalt base metal. Substitution of LCO by the cheaper NMC is ongoing, however also NMC shows severe safety issues. NMC is the abbreviation for $LiMO_2$, $M=Ni_{1-x-y}Mn_xCo_y$ based cathode materials.

LCO and NMC belong to the cathode materials with a layered crystal structure. Another crystal structure of Li battery cathode is the spinel structure. Cathode materials with spinel structure are for example LMO or LNMO. LMO stands for $LiMn_2O_4$ based cathode materials whereas LNMO is the abbreviation for $LiNi_{0.5}Mn_{1.5}O_4$ based cathode materials. These spinets promise improved safety but show other drawbacks. LMO in practice has a too low capacity and LNMO has a very high charge voltage which makes it very difficult to find a sufficiently stable electrolyte which can operate well within the wide voltage window.

Besides the layered crystal structure cathodes (LCO and NMC) and the spinel structure cathodes (LMO and LNMO), phosphate based cathode materials with olivine structure are also of interest, especially due to their inherently much higher safety. Olivine structured phosphate cathode materials were first proposed by Goodenough in 1996. The Goodenough U.S. Pat. No. 5,910,382 discloses examples for LFP as well as LFMP. LFP stands for $LiFePO_4$ and LFMP stands for $LiMPO_4$—with $M=Fe_{1-x}Mn_x$-based cathode materials. An obstacle for the commercialization of olivine crystal structure phosphate cathode materials is the inherently low electronic conductivity. Good electronic contact of the cathode is required because extracting (or re-inserting) of a Li cation requires the simultaneous extraction (or addition) of an electron: $LiMPO_4 \rightarrow MPO_4 + Li^+ + e^-$.

In U.S. Pat. No. 7,285,260, M. Armand and coworkers suggest a method to improve conductivity by carbon coating of olivine. After this disclosure, interest in olivine structure phosphates increased. Commercially most efforts focused on LFP. However—despite of the potentially low cost, high safety and high stability—LFP is still, commercially, a minor cathode material, mostly because LFP has a low energy density. Gravimetric energy density is the product of average voltage and capacity per mass of cathode material. Volumetric energy is the product of average voltage and capacity per volume of cathode material. Despite of a relatively high capacity of about 155-160 mAh/g the energy density (especially the volumetric energy density [Wh/L of cathode]) is insufficient for many applications. This is because of a relatively low crystallographic density (about 3.6 g/cm³) and a relatively low average operation voltage of only 3.3V. For comparison, $LiCoO_2$ has a similar capacity but the average voltage is 4.0V (instead of 3.3V) and the density is 5.05 g/cm³ (compared with 3.6 g/cm³ for LFP).

Already the Goodenough patent teaches that in LFP the transition metal, iron, can be replaced by other transition metals such as manganese. If some Mn replaces Fe then LFMP is obtained, whereas if all Fe is replaced by Mn LMP is formed. LMP stands for $LiMnPO_4$. LMP is of fundamental interest because it has a higher theoretical energy density.

Compared to LFP, LMP has about the same theoretical capacity but a higher average voltage (4.1V versus 3.3V) which promises a significant (24%) increase of the energy density; this effect is however partially offset (−6%) by a lower crystallographic density of LMP (3.4 g/cm³ versus 3.6 g/cm³ for LFP). Up to now, attempts to prepare truly competitive $LiMnPO_4$ failed. The reason for this poor performance is possibly the very low inherent conductivity of $LiMnPO_4$ which, even after carbon coating, prevents achieving a sufficient performance.

Basic properties and issues of LFP, LFMP and LMP are well described for example in "Olivine-type cathodes: Achievements and problems", Journal of Power Sources 119-121 (2003) 232-238, by Yamada et al. US 2009/0186277 A1 discloses improved $LiFePO_4$ based cathodes by deviating from the $Li:M:PO_4=1:1:1$ stoichiometric ratio. The patent discloses a Li:M (lithium:transition metal ratio) between 1-1.3 and a $PO_4$:M (phosphate to transition metal ratio) range of 1.0-1.14, and the transition metal is selected from Cr, Mn, Fe, Co or Ni. In one embodiment M is chosen as Fe, additionally doped by up to 5% of V, Nb, Ti, Al, Mn, Co, Ni, Mg, and Zr. The examples exclusively refer to M=Fe excluding doping by manganese or other elements. The examples demonstrate an advantage of the Li:M and $PO_4$:Fe ratio being non-stoichiometric. A stoichiometric ratio refers to $Li:M:PO_4=1.00:1.00:1.00$, corresponding to the ideal olivine formula $LiFePO_4$. The examples demonstrate that better LFMP performance can be achieved when choosing a Li:M and $PO_4$:M ratio exceeding 1.0.

In "Reaction Mechanism of the Olivine-Type $Li_xMn_{0.6}Fe_{0.4}PO_4$, $(0<x<1)$", *Journal of The Electrochemical Society*, 148 (7) A747-A754 (2001), Yamada et al. describe the electrochemical properties of LFMP. When Li is extracted, first a partially delithiated phase is created, the lattice constants change in a single phase manner until all Fe has changed valence state from 2- to 3-valent. After all Fe has reached the 3-valent state further delithiation creates a new phase—fully delithiated LFMP—which coexists with the partially delithiated phase, until all Mn has changed from 2- to 3-valent. The paper gives lattice constants for LFP, LFMP and LMP (see Table 1). In Table 1 the volume is the volume of the full unit-cell, containing 4 formula units of $LiMPO_4$. In the current invention the volume refers to the volume of a single formula unit. Using the data of Table 1 allows calculating an approximate lattice constant for LFMP using Vegard's law (linear change of lattice constants) for stoichiometric LFMP.

TABLE 1

Lattice constants of LFP, LFMP and LMP

| Phase | a (Å) | b (Å) | c (Å) | vol (Å³) |
|---|---|---|---|---|
| LFP | a1 = 6.008(1) | b1 = 10.324(2) | c1 = 4.694(1) | v1 = 291.1(6) |
| LMP | a2 = 6.108(1) | b2 = 10.455(2) | c2 = 4.750(2) | v2 = 303.3(5) |
| LFMP, M = $Fe_{1-x}Mn_x$ | a1(1 − x) + a2(x) | b1(1 − x) + b2(x) | c1(1 − x) + c2(x) | v1(1 − x) + v2(x) |

US 2011/0052988 A1 discloses an improved LFMP cathode material. The patent discloses improved performance by additionally doping of M (M=$Fe_{1-x}Mn_x$) by up to 10% of Co, Ni, V or Nb. In M the manganese content is 35-60 mol %. The composition of the LFMP olivine phosphate according the patent is not the exact ideal stoichiometric composition (Li:M:$PO_4$=1.00:1.00:1.00) but very near to the stoichiometric composition. The patent discloses a narrow range for Li:M=1.00-1.05, and a narrow $PO_4$:M=1.00-1.020 very near to the stoichiometric value. U.S. Pat. No. 7,858,233 discloses improved performance of LFP, also by deviating from the stoichiometric Li:M:$PO_4$=1.00:1.00:1.00 ratio. Optimum performance is obtained for Fe rich cathodes, where Li:M<1.0 and $PO_4$:M<1.0.

Whereas LCO has high Li diffusion and usually a sufficient electrical conductivity, the Li diffusion rate and electrical conductivity in LFP or LFMP olivine cathode materials is low. Whereas large compact LCO particles (of >20 μm size) can work well as cathode material, LFMP with as similar morphology cannot. LFMP needs to be nano-structured. Nano-structured refers to a morphology, where the Li diffusion path length in the solid is small. In the battery Li diffuses fast in the liquid electrolyte to the nano-particle, and then, in the solid only a short distance in-to or out-from the particle. Because of the short diffusion length good power can be achieved despite of poor diffusivity. Achieving a higher bulk Li diffusion and electrical conductivity allows for good performances with less need to nano-structure the cathode. The prior art does not sufficiently teach how to increase the bulk Li diffusion rate.

The nano-particle itself is usually part of a larger porous agglomerate of smaller sized primary nano-particles. So a high power LFMP cathode material is directly related to a small primary particle size. Besides of microscope investigations the BET surface area is a good tool to estimate the primary particle size. High performance LFMP typically has surface areas exceeding 10 $m^2$/g, whereas surface areas of large particle LCO can be as low as 0.15 $m^2$/g, but still delivering high rate performance LCO. The design of a preferred nano-morphology LFMP is a complex task. The morphology depends on the chemical composition and type of precursors. In many cases milling of precursors before firing is applied, to alter the morphology, but there are limitations. In principle, changing the sintering temperature allows to change the primary particle size, but for LFMP only a relatively small temperature window exists to achieve good electrochemical performance of final cathode products. Practically, temperatures high or low enough to dramatically reduce or increase the BET surface area usually give poor performance.

In the state of the art, there is a lack of efficient tools to alter the nano morphology of LFMP. When designing the optimized nano-morphology typically an increase of BET surface area causes a deterioration of other important parameters. So, nano-structured cathodes often do not pack well, the low pressed density causes a low electrode density, which again reduces the volumetric energy density of the final battery. The electrode density can be estimated by pellet density measurements. There is also a lack of knowledge of how to achieve higher surface areas without significantly deteriorating other properties like electrode density. None of the mentioned prior art improves the olivine structured phosphates sufficiently to make the material truly competitive for commercial mass applications. A further increase of capacity and power is required. Knowledge how to improve the bulk performance by change of composition or doping is needed. Knowledge how a change the composition or how doping can modify and improve the nano-morphology is also not yet sufficient available.

It is an object of the present invention to provide a solution for the problems related to (bulk) electrochemical performance, energy density, nano-morphology, surface area and electrode density.

SUMMARY

Viewed from a first aspect, the invention can provide an olivine cathode material comprising Li, M and $PO_4$, having a non-stoichiometric composition wherein:
the phosphor stoichiometry $PO_4$:[(Li+M)/2] is between 0.940 and 1.020,
the lithium to metal ratio Li:M is between 1.040 and 1.150,
and wherein M=$Fe_{1-x-z'}Mn_xD_{z'}$, with 0.10<x<0.90, z'>0, D being a dopant comprising either one or both of Cr and Mg. In one embodiment $PO_4$:[(Li+M)/2] is between 0.960 and 1.000, resulting in an even better performing material. Performance is improved even more in another embodiment wherein $PO_4$:[(Li+M)/2] is less than 1.000. Improvements in performance are also obtained for either an embodiment wherein the lithium to metal ratio Li:M is between 1.070 and 1.120; or an embodiment wherein the manganese to iron ratio Mn/(Mn+Fe) is between 0.25 and 0.75; or for another embodiment wherein z'<0.05.

The olivine cathode materials described here may have a BET surface area value >30 $m^2$/g.

In embodiments where D comprises Cr a BET surface area value >40 $m^2$/g may be obtained. In a particular embodiment showing some synergy, D comprises both Mg and Cr. In such an embodiment better results are even obtained when 0.010<z'<0.045, and especially when 0.020<z'<0.030.

In yet another embodiment M=$Fe_{1-x-y-z}Mn_xMg_yCr_z$, and the unit cell volume for one formula unit of olivine is given by the equation:

Vol=74.21478±ΔVol−(3.87150*$y$)−(3.76943*$z$)+(3.04572*[($x$/(1−$y$−$z$))−0.5], with ΔVol=0.0255. In this equation, an even improved composition is obtained for ΔVol=0.0126.

In the invention, the correct choice of composition is important. Within the Li-M-$PO_4$ phase diagram, only a narrow range of compositions gives a good performance. In one of the optimized embodiments, the phosphor stoichiometry is $PO_4:[(Li+M)/2]=0.980\pm0.020$ and the lithium to metal ratio is $Li:M=1.095\pm0.025$. M is dominantly Mn and Fe, it can also be doped by a dopant D in the formula $M=Fe_{1-x-z}Mn_xD_z$, where x is about 0.5 but can range from 0.25 to 0.75.

Besides composition also the choice of dopants is very important. In one embodiment, both Cr and Mg doping improves the performance significantly. The optimum Li-M-$PO_4$ composition within the ternary phase diagram does not change by doping, both the optimum phosphor stoichiometry and lithium:metal ratio remain stable.

The improved performance in the case of Mg doping is not caused by a change of morphology, since the BET surface area and crystallite size is not changed by Mg doping. Apparently, Mg doping improves Li diffusivity. Without being bound by theory, such improvements require that either the bulk Li diffusion improves significantly or that surface charge transfer properties improve dramatically. The improved performance in the case of Cr doping, is at least partially caused by a modification of the morphology. Applying Cr doping results in a high BET surface area which allows for higher rate performances. Without being bound by theory, Cr is believed to act as a sintering inhibitor, and in this way Cr doping can be used to obtain a desired morphology.

BRIEF DESCRIPTION OF THE DRAWINGS

Numbering Corresponds to the Numbering of the Examples

FIG. 1.1: phase diagram indicating some compositions of non-stoichiometric LFMP according to the invention FIG. 1.2: Contour plots of discharge capacity of non-doped non-stoichiometric LFMP.

FIG. 2.1: Contour plots of discharge capacity of 4.5 mol % Mg-doped non-stoichiometric LFMP.

FIG. 3.1: Contour plots of discharge capacity of 2.3 mol % Mg- and 2.3 mol % Cr-doped non-stoichiometric LFMP.

FIG. 5.1: Rate performance of non-doped and (a) Mg- and (b) Cr-doped LFMP as a function of C-rate.

FIG. 7.1: XRD diffraction pattern and Rietveld refinement of nonstoichiometric LFMP with optimum Li:M ratio and phosphor composition: (a) non doped (b) 3% Mg doped, (c) 3% Cr doped, (d) 2.3+2.3% Mg+Cr doped and (e) undoped with MF=25%.

FIG. 8.1: Volume changes linear as a function of doping in samples with optimized P (0.982) and LM (1.095) stoichiometry.

FIG. 8.2: Volume (calculated by Formula 1) plotted versus measured volume obtained from Rietveld refinement for a large series of samples with different compositions.

DETAILED DESCRIPTION

EXPERIMENTAL DETAILS

Preparation of Lithium Iron Phosphate (LFMP)

The LFMP of the present invention is prepared by the following major steps:
(a) blending of lithium, iron, manganese, phosphate, dopants and carbon precursors;
(b) synthesizing in a reducing atmosphere; and
(c) milling.

The detailed explanation of each step is as follows:
Step (a): blending of lithium, iron, manganese, phosphate, dopants and carbon precursors for example using a ball mill process. The precursors are put in a vial with zirconia balls and acetone. In one embodiment, lithium carbonate, iron oxalate dihydrate, manganese oxalate, and ammonium phosphate are used as the lithium, iron, manganese, and phosphate precursor. In another embodiment, magnesium hydroxide and chromium acetate hydroxide are used as precursors of magnesium and chromium. Polyethylene-block-polyethylene glycol (PE-PEG) may be used as a carbon precursor for improving electric conductivity. The precursors are milled and blended in the vial by a ball mill process. The wet-type blend is dried at 120° C. in an oven to remove acetone. Finally, the dried blend is milled by a grinding machine.

Step (b): sintering in a reducing atmosphere. The LFMP sample is synthesized by using the blend from step (a) in a tube furnace in a reducing atmosphere. In one embodiment the sintering temperature is 650° C. and the dwell time is 2 hours. A mixture of nitrogen ($N_2$, 99%) and hydrogen ($H_2$, 1%) gas may be used as a reducing gas.

Step (c): milling. After sintering, finally, the sample is milled by a grinding machine.

Preparation of a Lithium Ion Secondary Cell

A cell in the present invention is prepared by the following major steps:
(a) preparation of a positive electrode, and
(b) cell assembly.

The detailed explanation of each step is as follows:
Step (a): preparation of a positive electrode. A slurry that contains the electrochemical active material LFMP, the conductor, binder and a solvent is prepared by a homogenizing process. The formulation comprising the electrochemical active material, conductor, and binder is for example 83.3:8.3:8.3. In one embodiment, conductive carbon black (Super P, produced by Timcal) and PVDF polymer (KF#9305, by Kureha), 1-Methyl-2-Pyrrolidone (NMP, by Sigma-Aldrich) are used as a conductor, a solution of a binder, and a solvent, respectively. These materials are homogenized in a metal cup for 45 minutes by using a homogenizer (HF-93, by SMT). The homogenized slurry is spread on a side of an aluminum foil by using a doctor blade coater. It is dried in an oven at 120° C., pressed by using a calendaring tool, and dried again in a vacuum oven to remove the solvent.

Step (b): cell assembling. In the present invention, a half cell (coin cell) is used to test electrochemical properties. The half cell is assembled in a glovebox which is filled with an inert gas (argon). A separator (from SK Innovation) is located between the positive electrode and a piece of lithium metal as a negative electrode. 1M $LiPF_6$ in EC/DMC (1:2) is used as an electrolyte, dropped between separator and electrodes.

Cell Testing Procedure

All the cell tests in the present invention follow the same procedure shown in Table 2. A C-rate can be defined as an inverse number of an hour to charge or discharge 140 mAh/g. For example, 5C means that the cell will be charged or discharged in ⅕ hour. "E-Curr" and "V" stands for the end current and cut-off voltage, respectively. At the first cycle, the DQ1 (discharge capacity of the first cycle) and IRRQ (irreversible capacity) are determined. The rate performance can be calculated from the second to the sixth cycle. The seventh cycle is repeated fifty times to obtain information on the cycle stability.

TABLE 2

| | | coin cell testing procedure | | | | | |
|---|---|---|---|---|---|---|---|
| | | Charge | | | Discharge | | |
| Cycle # | times | C-rate | E-Curr | V | C-rate | E-Curr | V |
| 1 | 1 | 0.1 | 0.05 C | 4.4 | 0.1 | — | 2.7 |
| 2 | 1 | 0.2 | 0.05 C | 4.4 | 1 | — | 2.7 |
| 3 | 1 | 0.2 | 0.05 C | 4.4 | 5 | — | 2.7 |
| 4 | 1 | 0.2 | 0.05 C | 4.4 | 10 | — | 2.7 |
| 5 | 1 | 0.2 | 0.05 C | 4.4 | 15 | — | 2.7 |
| 6 | 1 | 0.2 | 0.05 C | 4.4 | 20 | — | 2.7 |
| 7 | 50 | 0.5 | 0.05 C | 4.4 | 1 | — | 2.7 |

The authors discovered that the active material's properties change in a systematic manner as a function of the basic composition. The selection of the phosphor stoichiometry—further also referred to as "P", with $P=PO_4:[(Li+M)/2]$—plays a crucial role in this, since the properties of the material according to the invention change systematically as well as dramatically as a function of the phosphor stoichiometry P. In one embodiment that gave excellent results, the phosphor stoichiometry is 0.980±0.040, in another embodiment it is 0.980±0.020, giving even better results. Small deviations from these optimum values, i.e. by more than 2 to 4%, may entail a significant deterioration of performance. For the cathode materials with an optimum phosphor stoichiometry, a relatively broad region of optimum lithium to metal ratio can be determined, which is an additional advantage in the preparation of the materials. In one embodiment, the lithium to metal ratio (further referred to as LM) $LM=Li:M$ is 1.095±0.055 yielding excellent results, in another embodiment it is 1.095±0.025 for even better results.

In one embodiment the MF ratio=Mn:(Mn+Fe) in LFMP is in the 0.25 to 0.75 range, because:
for the lower limit: the average voltage increases with MF ratio (MF=Mn:(Mn+Fe)), and an average voltage higher than that of LFP is possible or even desired,
for the upper limit: the inventors observed that above MF=0.75, it is more difficult to obtain high power cathode materials. Apparently, as long as MF<0.75 lithium bulk properties (Li diffusion, electrical conductivity) are sufficiently high, but they could deteriorate when the MF ratio exceeds 0.75.

The cathode materials are non-stoichiometric, thus the lithium:metal ratio (LM=Li:M) and the phosphor stoichiometry ($P=PO_4:[(Li+M)/2]$) deviate from unity. In the LFMP formulation

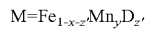

$M=Fe_{1-x-z}Mn_yD_{z'}$ where D is a dopant, and D comprises at least one selected from Mg and Cr.

Surprisingly, the performance of LFMP depends very sensitively on the phosphor stoichiometry $PO_4:[(Li+M)/2]$, and the optimum performance is not achieved near to the stoichiometric value 1:1. A good performance is defined by a high reversible capacity, high rate performance and good cycling stability. Small deviations of the optimum phosphor stoichiometry result in significant deviations of the electrochemical performance. Previous art usually report a lithium to metal ratio Li:M and a phosphor to metal ratio $PO_4$:M. In the current application we detected that the use of phosphor stoichiometry, being $PO_4:[(Li+M)/2]$, is a more appropriate variable, since the variation in electrochemical performance can be predicted more accurately by using the latter stoichiometric ratio "P".

In several embodiments, the cathodes have an optimum lithium metal ratio LM=Li:M of about 1.095 and a phosphor stoichiometry $P=PO_4/[(Li+M)/2]$ of about 0.980, and, surprisingly, the optimum lithium metal ratio LM and the optimum phosphor stoichiometry P do not depend on the choice of dopants. In the formula $M=Fe_{1-x-z}Mn_xD_z$, the dopant D, comprising at least one selected from Mg and Cr, has two main functions:

Mg improves the bulk properties, and additionally the improved performance is obtained without altering the nano-morphology, Cr on the other hand changes the micro structure. Cr might also have a positive influence of the bulk performance. Cr is considered in this invention as a "morphology dopant": surprisingly, Cr doping somehow changes the sintering properties so that a nano-morphology with larger BET is achieved. The high BET improves power, especially expressed in a higher rate performance. At the same time, the higher BET does not cause a dramatic deterioration of pellet density.

Mg and Cr doping thus allows improving performance, where this does not depend dramatically on doping level.

The cathodes used for the examples of the current invention contain about 2000-3000 ppm calcium.

Example 1

Non-Stoichiometric LFMP

FIG. 1.1 shows the phase diagram indicating certain compositions of non-stoichiometric LFMP, indicated by Roman numerals I to XI, the 1:1:1 stoichiometric ratio indicated by ☆. For the compositions in this Example, the amount of Mn equals the amount of Fe. The sample ID (identity) in the present invention is composed of two parts; the composition and doping state. The Roman numerals, shown in FIG. 1.1, stand for the target composition of each non-stoichiometric LFMP sample. The result of an ICP (inductively coupled plasma) analysis shows good agreement with the target composition. The non-stoichiometric LFMP and the coin cells are prepared and analyzed by the procedure described before.

Seven non-stoichiometric LFMP samples are prepared without doping. The electrochemical properties of the each sample are shown in Table 3. "-ND" in a sample ID stands for a sample without doping by Mg and/or Cr. DQ1, IRRQ, 5C, and Fading means the discharge capacity of the first cycle, the ratio of irreversible capacity, the discharge capacity at 5C, and the ratio of the faded discharge capacity after 100 cycles, respectively. Most physical and electrochemical properties shift sensitively as a function of the ratio of $PO_4$ content to (Li+M) content. Three samples of which $PO_4$:[(Li+M)/2] values are close to 0.982 have higher discharge capacity, lower irreversible capacity, better rate performance, and acceptable cycle stability. FIG. 1.2 is the contour plot of the discharge capacity (in mAh/g) of non-stoichiometric LFMP as a function of composition. In terms of the electrochemical properties, by interpolation it can be deduced that the composition range where $P=PO_4:[(Li+M)/2]$ is 0.980±0.040, and LM=Li:M is 1.095±0.055, is an optimized composition embodiment of the non-stoichiometric LFMP. In another embodiment even better electrochemical properties are achieved for P=0.980±0.020 and LM=1.095±0.025.

TABLE 3

Electrochemical properties of non-stoichiometric
LFMP samples as a function of composition

| Sample ID | Composition | | | DQ1 (mAh/g) | IRRQ (%) | 5 C (mAh/g) | Fading (%/100) |
|---|---|---|---|---|---|---|---|
| | $PO_4/M$ | $Li/M$ | $PO_4/[(Li+M)/2]$ | | | | |
| II-ND | 1.066 | 1.074 | 1.028 | 140.0 | 6.4 | 113.5 | 1.8 |
| III-ND | 1.100 | 1.142 | 1.028 | 127.8 | 8.1 | 90.8 | −5.4 |
| V-ND | 1.003 | 1.042 | 0.982 | 140.0 | 3.9 | 122.0 | −0.7 |
| VI-ND | 1.034 | 1.106 | 0.982 | 144.0 | 2.8 | 125.8 | −0.9 |
| VII-ND | 1.068 | 1.174 | 0.982 | 141.4 | 3.1 | 122.9 | −3.4 |
| IX-ND | 0.972 | 1.072 | 0.939 | 136.9 | 13.9 | 121.5 | −2.6 |
| X-ND | 1.003 | 1.137 | 0.939 | 138.8 | 10.7 | 123.1 | −2.1 |

Example 2

Mg-Doped Non-Stoichiometric LFMP

Eleven Mg-doped non-stoichiometric LFMP samples are prepared and analyzed by the procedure described before. The amount of Mn equals the amount of Fe. The electrochemical properties of each sample is shown in Table 4. The Roman numerals and "-45M" in a sample ID stand for the target composition of each LFMP samples as shown in FIG. 1.1, each sample containing 4.5 mol % Mg. The doping level z' can be defined as the molar ratio of the dopant content to the metal, D/(Fe+Mn+D). Most physical and electrochemical properties shift sensitively as a function of the ratio of $PO_4$ content to (Li+M) content. Four samples of which $PO_4:[(Li+M)/2]$ values are close to 0.98 have higher discharge capacity, lower irreversible capacity, better rate performance, and acceptable cycle stability. FIG. 2.1 is the contour plot of the discharge capacity of the Mg-doped non-stoichiometric LFMP as a function of composition. As in Example 1, in terms of the electrochemical properties, by interpolation it can be deduced that the composition range where $P=PO_4:[(Li+M)/2]$ is 0.980±0.04, and LM=Li:M is 1.095±0.055, is an optimized composition embodiment of the non-stoichiometric LFMP. In another embodiment even better electrochemical properties are achieved for P=0.980±0.020 and LM=1.095±0.025.

TABLE 4

Electrochemical properties of 4.5 mol % Mg-doped
LFMP samples as a function of composition

| Sample ID | Composition | | | DQ1 (mAh/g) | IRRQ (%) | 5 C (mAh/g) | Fading (%/100) |
|---|---|---|---|---|---|---|---|
| | $PO_4/M$ | $Li/M$ | $PO_4/[(Li+M)/2]$ | | | | |
| I-45M | 1.033 | 1.011 | 1.028 | 122.9 | 6.8 | 103.9 | −6.9 |
| II-45M | 1.066 | 1.074 | 1.028 | 133.7 | 6.5 | 109.6 | −1.1 |
| III-45M | 1.100 | 1.142 | 1.028 | 118.8 | 11.1 | 88.8 | 0.3 |
| IV-45M | 1.137 | 1.213 | 1.028 | 109.9 | 12.3 | 80.8 | −1.6 |
| V-45M | 1.003 | 1.042 | 0.982 | 143.7 | 3.4 | 128.8 | 0.2 |
| VI-45M | 1.034 | 1.106 | 0.982 | 144.5 | 2.9 | 126.2 | 0.6 |
| VII-45M | 1.068 | 1.174 | 0.982 | 142.6 | 3.1 | 124.5 | 2.6 |
| VIII-45M | 1.104 | 1.247 | 0.982 | 139.5 | 2.3 | 121.9 | 2.8 |
| IX-45M | 0.972 | 1.072 | 0.939 | 138.6 | 9.7 | 121.6 | 1.3 |
| X-45M | 1.003 | 1.137 | 0.939 | 135.6 | 10.3 | 115.5 | 3.1 |
| XI-45M | 1.036 | 1.207 | 0.939 | 134.2 | 4.1 | 118.8 | 1.8 |

Example 3

Mg- and Cr-Doped Non-Stoichiometric LFMP

Seven Mg- and Cr-doped non-stoichiometric LFMP samples are prepared and analyzed by the procedure described before. The amount of Mn equals the amount of Fe. The electrochemical properties of the each sample are shown in Table 5. The Roman numerals and "-23MC" in a sample ID stand for the target composition of each LFMP samples as shown in FIG. 1.1, each sample containing 2.3 mol % Mg and 2.3 mol % Cr. Most physical and electrochemical properties shift sensitively as a function of the ratio of $PO_4$ content to (Li+M) content. Three samples of which $PO_4:[(Li+M)/2]$ values are close to 0.98 have higher discharge capacity, lower irreversible capacity, better rate performance, and acceptable cycle stability. FIG. 3.1 is the contour plot of the discharge capacity of the Mg- and Cr-doped non-stoichiometric LFMP as a function of composition. As in Examples 1 and 2, in terms of the electrochemical properties, by interpolation it can be deduced that the composition range where $P=PO_4:[(Li+M)/2]$ is 0.980±0.040, and LM=Li:M is 1.095±0.055, is an optimized composition embodiment of the non-stoichiometric LFMP. In another embodiment even better electrochemical properties are achieved for P=0.980±0.020 and LM=1.095±0.025.

TABLE 5

Electrochemical properties of 2.3 mol % Mg- and Cr-
doped LFMP samples as a function of composition

| Sample ID | Composition | | | DQ1 (mAh/g) | IRRQ (%) | 5 C (mAh/g) | Fading (%/100) |
|---|---|---|---|---|---|---|---|
| | $PO_4/M$ | $Li/M$ | $PO_4/[(Li+M)/2]$ | | | | |
| II-23MC | 1.066 | 1.074 | 1.028 | 129.6 | 7.5 | 102.5 | −3.2 |
| III-23MC | 1.100 | 1.142 | 1.028 | 123.1 | 7.7 | 93.3 | 0.0 |
| V-23MC | 1.003 | 1.042 | 0.982 | 144.0 | 3.0 | 130.0 | 2.0 |
| VI-23MC | 1.034 | 1.106 | 0.982 | 146.2 | 2.5 | 131.9 | 1.2 |
| VII-23MC | 1.068 | 1.174 | 0.982 | 140.9 | 2.6 | 128.3 | 1.9 |
| IX-23MC | 0.972 | 1.072 | 0.939 | 139.0 | 2.8 | 124.5 | 1.4 |
| X-23MC | 1.003 | 1.137 | 0.939 | 140.2 | 2.3 | 120.4 | 0.2 |

Observations related to Examples 1 to 3: Example 1 shows the electrochemical properties as a function of phase composition. It can be concluded by interpolation that the best performance is achieved at the lithium to metal ratio LM of about 1.095 and a phosphor stoichiometry P of about 0.980. Surprisingly, doping has no influence on these LM and P ratios. When $M=Fe_{1-y-z}Mn_yD_z$, with D=Mg and/or Cr, the optimum $PO_4:[(Li+M)/2]$ remains at about 0.980±0.040. In the formula of M, y is near to 0.5, and z is the doping level. Examples 2 and 3 show the electrochemical properties as a function of phase composition for z'=0.045 (4.5 mol %) Mg and z'=2.3 mol % Mg+2.3 mol % Cr, respectively. Both for Mg doping as well as for Cr+Mg doping, an improvement of performance is observed. Compared to the non-doped case, the capacity may increase by about 1 mAh/g for Mg doping and 2 mAh/g for Cr+Mg doping. At high rates a more dramatic improvement is observed—Mg doping improves the capacity at 5C discharge rate by 2 mAh/g and Cr+Mg doping increases the capacity at 5C by 5 mAh/g. A synergetic effect of Cr and Mg doping can be clearly observed. A detailed investigation of many data (BET, conductivity, coin cell performance, crystallinity, etc.—see also the following Examples) clearly shows that—independently of the choice of the dopants—a similar trend in properties as function of LM and P ratio is achieved, and in particular the doping does not change the optimum composition determined by LM and P. Such behaviour might be expected for homovalent doping, where for example $Mg^{2+}$ replaces $Fe^{2+}$, since in LFP, Fe and Mg are both divalent. It might not be expected for Cr doping, since contrary to Mg, Cr doping is hetero-valent because $Cr^{2+}$ is usually not stable. If $Cr^{3+}$ replaces $Fe^{2+}$, we would expect that the Li:M ratio need to be adjusted as well, but the surprising fact that the optimum Li:M and $PO_4$:[(Li+M)/2] does not change for Cr doping is unexpected. It might be that both Mn and Fe in non-stoichiometric LFMP are not solely divalent, so that replacement of 3-valent Mn or Fe by Cr and divalent Fe and Mn by Mg is a theoretical possibility.

Example 4

Comparison of BET and Pressed Density for Non-Doped, Mg-Doped, Mg- and Cr-Doped LFMP Table 6 shows BET and pressed density as a function of composition (Li:M and phosphor stoichiometry) and doping content z', with $M=Fe_{1-x-z}Mn_xD_z$. "ST" in a sample ID stands for the stoichiometric LFMP samples and "VI" stands for the target composition Li:M=1.106 and $PO_4$:[(Li+M)/2]=0.982 as shown in FIG. 1. The two digit figure like "23", and "45" in sample ID is the tenfold amount of doping level. The "ND", "M", "MC", and "C" stands for the non-doped, Mg-doped, Mg- and Cr-doped, and Cr-doped, respectively. The doping level z' is defined as the molar ratio of the dopant content to the metal contents D/(Fe+Mn+D).

Mg doping does not alter the morphology of LFMP compared with non-doped LFMP. Therefore, the observed improvement of performance (rate) for Mg doping is caused by an improved bulk performance. The situation is different in the case of Mg- and Cr-doped LFMP. In this case an increased surface area is obtained. The higher BET surface area is expected to contribute to a better capacity and rate performance. Obviously the improvement of performance after Mg and Cr doping—at least partially—is related to the different morphology. Thus, Cr doping is a more efficient tool for micro-morphology design. Without being bound by theory the inventors believe that Cr doping and Mg doping have a synergetic effect. For at least some degree, Cr contributes to higher surface area, whereas Mg contributes to better Li diffusivity. Typically, higher BET causes a lower pressed density which reduces the volumetric energy density of the final battery. However, in terms of the electrode density (pressed density) of 4.5 mol % Cr-doped LFMP, pressed density decreases by only 6.0% while BET increases by 47%.

TABLE 6

BET surface area and pressed density as functions of composition and doping state

| Sample ID | Composition | | | BET (m²/g) | Density (g/cm³) |
|---|---|---|---|---|---|
| | $PO_4$/M | Li/M | $PO_4$/[(Li + M)/2] | | |
| ST-ND | 1.000 | 1.000 | 1.000 | 32.3 | |
| ST-45M | 1.000 | 1.000 | 1.000 | 32.5 | |
| VI-ND | 1.034 | 1.106 | 0.982 | 28.8 | 1.64 |
| VI-45M | 1.034 | 1.106 | 0.982 | 30.9 | 1.64 |
| VI-23MC | 1.034 | 1.106 | 0.982 | 33.8 | |
| VI-45C | 1.034 | 1.106 | 0.982 | 42.3 | 1.54 |

For the compositions according to the invention, a BET value of at least 30 m²/g is easily obtained.

Example 5

Comparison of Non-Stoichiometric LFMP with Mg or Cr-Doped Non-Stoichiometric LFMP as a Function of Doping Level The Examples 1-3 indicate that for the group of analysed samples, the non-stoichiometric LFMP that has the specific composition for which P=0.982 and LM=1.106, has the best electrochemical properties, and that these electrochemical properties can be improved by doping. In one embodiment, Mg and Cr are used as the doping elements to improve the electrochemical properties. Table 7 shows the BET and electrochemical properties of the non-stoichiometric LFMP samples as a function of the doping state. Seven non-stoichiometric LFMP samples (wherein the amount of Mn equals the amount of Fe) and coin cells are prepared and analyzed by the procedure described before. The "VI-" in a sample ID stand for the target composition of each LFMP samples as shown in FIG. 1.1, which means the composition of the seven samples is identical. The two digit figure like "15", "30", and "40" in sample ID is the tenfold amount of doping level. The "ND", "M", and "C" stands for the non-doped, Mg-doped, and Cr-doped, respectively. For example, "VI-45C" stands for a 4.5 mol % Cr doped sample of which $PO_4$/[(Li+M)/2] is 0.982 and Li/M is 1.106. The doping level z' can be defined as the molar ratio of the dopant content to the metal contents D/(Fe+Mn+D).

The BET surface area and discharge capacity of non-stoichiometric LFMP samples increases especially by Cr doping. FIG. 5.1 (a) and (b) show the rate performance (%) as a function of the doping state and C-rate. The rate performance is the ratio of the discharge capacity at each C-rate to the discharge capacity at 0.1C. The improvement of the rate performance by Mg doping is less significant compared to that by Cr doping. Among the Cr-doped LFMP samples, "VI-15C," which contains 1.5 mol % Cr, has good rate performance. Generally, doped samples are better than non-doped samples, but the performance does not dramatically vary according to on the doping level z'.

TABLE 7

BET and electrochemical properties of non-stoichiometric LFMP samples as function of the variety of dopants and the amount of dopant.

| Sample ID | Composition | | | BET (m2/g) | DQ1 (mAh/g) | IRRQ (%) | 5 C (mAh/g) | Fading (%/100) |
|---|---|---|---|---|---|---|---|---|
| | $PO_4$/M | Li/M | $PO_4$/[(Li + M)/2] | | | | | |
| VI-ND | 1.034 | 1.106 | 0.982 | 28.8 | 144.0 | 2.8 | 125.8 | −0.9 |
| VI-15M | 1.034 | 1.106 | 0.982 | 30.9 | 144.7 | 2.7 | 128.3 | 0.7 |
| VI-30M | 1.034 | 1.106 | 0.982 | 30.6 | 143.0 | 2.8 | 125.7 | −0.1 |
| VI-45M | 1.034 | 1.106 | 0.982 | 31.0 | 144.5 | 2.9 | 126.2 | 0.6 |
| VI-15C | 1.034 | 1.106 | 0.982 | 36.0 | 147.8 | 2.3 | 136.6 | 0.8 |
| VI-30C | 1.034 | 1.106 | 0.982 | 40.3 | 150.1 | 2.7 | 134.9 | 2.1 |
| VI-45C | 1.034 | 1.106 | 0.982 | 42.3 | 149.6 | 2.8 | 139.7 | 1.4 |

Conclusion: Example 5 compares different LFMP samples having the same composition with a phosphor stoichiometry $PO_4$:[(Li+M)/2]=0.982 and a lithium to metal ratio of Li:M=1.106, but with different dopants and doping levels z', for D=Mg or Cr, in the global formula $M=Fe_{1-x-z}Mn_xD_z$. In this Example doping up to relatively high levels of z'=0.045 is demonstrated. The Example confirms the higher performance of both Mg as well as Cr doped non-stoichiometric LFMP, compared to the non-doped reference with similar phosphor stoichiometry and lithium:metal ratio. Comparing the surface area confirms that observations in Examples 2 and 3 that Cr doping, contrary to Mg doping, creates a larger surface area. Obviously Cr acts as a sintering inhibitor. The data confirms that doping improves performance, but generally, the performance of doped LFMP is relatively robust and does not depend sensitively on doping level. An optimum performance is achieved at about 3 mol % doping, but the performance remains good for doping from 1.5 up to 4.5 mol %.

Example 6

Fixed PO₄ and Li:M Stoichiometry and Varying Mn:(Mn+Fe) Ratio

Five undoped non-stoichiometric LFMP samples which have the P and LM stoichiometry of sample "VI-" but with varying Mn:(Mn+Fe) ratio are prepared and analyzed by the procedure described before. The physical and electrochemical properties of the samples are shown in Table 8. "VI-" in a sample ID stands for the specific composition of which $PO_4:[(Li+M)/2]$ is 0.982 and Li/M is 1.106, and "0MF, 25MF, 50MF, 75MF, 100MF" stands for the Mn:(Mn+Fe) ratio in mol %. DQ1, IRRQ, 5C, $V_{avg}$ and Energy density mean the discharge capacity of the first cycle, the ratio of irreversible capacity (1−discharge capacity/charge capacity), the discharge capacity at 5C, the average voltage during the first cycle and the energy density calculated from the discharge capacity and average voltage of the first cycle, respectively. The column "volume" gives the unit cell volume per olivine formula unit $LiMPO_4$.

TABLE 8

Physical and electrochemical properties of non-doped LFMP samples as a function of Mn:(Mn + Fe) ratio

| Sample ID | Mn: (Mn + Fe) ratio | Volume (Å³) | DQ1 (mAh/g) | IRRQ (%) | 5 C (mAh/g) | $V_{avg}$ (V) | Energy density (mWh/g) |
|---|---|---|---|---|---|---|---|
| VI-0MF | 0% | 72.6747 | 158.5 | −0.8 | 148.3 | 3.40 | 538.8 |
| VI-25MF | 25% | 73.4495 | 153.6 | 0.1 | 143.7 | 3.57 | 548.2 |
| VI-50MF | 50% | 74.2107 | 144.0 | 2.8 | 125.8 | 3.71 | 533.9 |
| VI-75MF | 75% | 74.9960 | 136.2 | 3.3 | 121.7 | 3.86 | 525.9 |
| VI-100MF | 100% | 75.7086 | 111.0 | 9.0 | 69.9 | 3.87 | 428.9 |

In terms of energy density, an excellent result at MF=0.25 is achieved for the non-stoichiometric composition with P=0.982 and LM=1.106. VI-25MF has the highest energy density value among these samples and higher average voltage than VI-0MF (LFP). As MF ratio increases from 0.25 to 0.75, the discharge capacity decreases linearly while the average voltage increases linearly and the energy density decreases because the decreasing ratio of the discharge capacity is higher than increasing ratio of the average voltage. At MF=1.00, a relatively poor performance is obtained. It can be stated that the performance of LFMP starts deteriorating at about MF=0.75.

Conclusion: Example 6 shows results for non-stoichiometric LFMP having different MF ratio (MF=Mn:(Mn+Fe)). For MF=0.25, excellent results (high energy density and average voltage) are achieved for the non-stoichiometric composition with P=0.982 and LM=1.106. At MF>0.75 a loss in performance is measured. Therefore, in one embodiment, the optimized MF ratio range is from 0.25 to 0.75. It can further be deduced that, independent of the doping level, for 0.10<x<0.90 in $M=Fe_{1-x-z}Mn_xD_z$, good results may be obtained.

Example 7

XRD Diffraction Data for Samples with Preferred Composition

This Example shows results of XRD powder diffraction and Rietveld refinement for selected samples "VI-". Table 8 lists the samples and the results for the lattice constants a, b, c obtained from the Rietveld refinement. FIG. 7.1 (a) to (e) shows the XRD refined pattern graphs of samples VI-ND (a), VI-30M (b), VI-23MC (c), VI-30C (d) and VI-MF25 (e). In samples (a) to (d) the amount of Mn equals the amount of Fe. The Figure shows the measured pattern, calculated pattern and the difference between both patterns. No major impurities can be resolved. The last column in Table 8 gives the unit cell volume Vol calculated by the Formula 1 below. The result in the table shows that the calculated volume is near to the measured volume. Obviously the unit cell volume Vol can very well be estimated by using Formula 1.

In the formula P is the phosphor stoichiometry $PO_4:[(Li+M)/2]$, LM is the lithium to metal ratio Li:M, Mg and Cr are the doping levels y, z and MF is the manganese stoichiometry x, defined by $M=Fe_{1-x-y-z}Mn_xMg_yCr_z$. When the optimum values for P and LM are put into Formula 1; for a sample with a given Cr, Mg and Mn content, the unit cell volume that is measured should be within less than 0.02% from the value calculated using Formula 1 to confirm that the optimum P and LM ratios are achieved.

TABLE 8

XRD diffraction results for selected samples with preferred non-stoichiometric PO₄ and Li:M stoichiometry

| Sample | a (Å) | b (Å) | c (Å) | Vol (Å³) | Vol (calc) |
|---|---|---|---|---|---|
| VI-ND | 6.0549 | 10.3872 | 4.7198 | 74.2107 | 74.2127 |
| VI-30M | 6.0508 | 10.3801 | 4.7192 | 74.1020 | 74.0965 |
| VI-30C | 6.0512 | 10.3780 | 4.7197 | 74.0988 | 74.0996 |
| VI-23MC | 6.0487 | 10.3739 | 4.7189 | 74.0271 | 74.0408 |
| VI-MF25 | 6.0295 | 10.3548 | 4.7057 | 73.4495 | 73.4490 |

Vol=74.2107−0.5404(P−1)−0.0708(LM−1)− 3.8715Mg−3.7694Cr+3.0457(MF−0.5)    Formula 1:

Conclusion: Example 7 shows the XRD results of several samples with optimum composition. The XRD diffraction pattern confirms that basically single phase olivine is obtained, clear phase impurities are not detected. If however the phosphor ratio P deviates from its optimum value (0.94 to 1.02) then impurities appear.

Example 8

Relation Between Optimum Stoichiometry (Phosphor Stoichiometry and Lithium to Metal Ratio) and Unit Cell Volume by XRD XRD lattice constants can be measured very accurately. Contrary to that, chemical analysis methods like ICP, are less accurate to check the stoichiometry. In the case of non-stoichiometric samples quite generally XRD lattice constants change as a function of stoichiometry (phosphor stoichiometry and Li to metal ratio) as well as a function of doping level (Mg, Cr). Therefore, XRD diffraction is a powerful tool to confirm that the optimized stoichiometry of the present invention has been obtained. Of particular interest is the unit cell volume calculated from the lattice constants, because it is less sensitive to experimental scattering.

The inventors observed that the change of volume for doping (Cr, Mg) as well as for change of the manganese stoichiometry MF (Mn:(Mn+Fe)) follows in a good approximation Vegard's law, displaying linear relations. FIG. 8.1 gives examples for these linear relations, the ☆ stand for the measured values, the dotted line for the linear fits. These linear relations make it possible to confirm if the optimum stoichiometry $PO_4:[(Li+M)/2]$ and Li:M is obtained by using Formula 1 to correct for the doping. FIG. 8.2 shows a plot of many samples having different phosphor stoichiometry, lithium to metal ratio and doping levels of Mg and Cr using samples of the previous examples. The X-axis shows the volume (in $Å^3$), obtained from the Rietveld refinement. The Y-axis shows the volume obtained when applying Formula 1. The Figure does not show the data for Mn:Fe series because the unit cell volume changes much more. Here the Mn contents equaled the Fe content. The scale on the right is given as a kind of ruler to see how much volume can be changed by doping. The position of 0.00% was chosen randomly.

Obviously the unit cell volume changes significantly and systematically as a function of phosphor stoichiometry and lithium to metal ratio, and the calculated volume (using Formula 1) fits well to the observed volume (obtained from Rietveld refinement).

Thus Formula 1 can be used to express the region of optimized stoichiometry. The volume decreases with increasing phosphor stoichiometry and lithium to metal ratio. The optimum phosphor stoichiometry is 0.980±0.040, more preferred 0.980±0.020. The optimum lithium to metal ration is 1.095±0.055, more preferred 1.095±0.025. Using these values in Formula 1, we obtain Formula 2 which describes the optimum volume (in $Å^3$) as function of doping.

$$Vol = 74.2148 \pm \Delta Vol - 3.8715 Mg - 3.7694 Cr + 3.0457 (MF - 0.5) \qquad \text{Formula 2:}$$

where Mg is the doping level of magnesium, y, in M. Cr is the doping level of chromium, z, in M, $M=Fe_{1-x-y-z}Mn_xMg_yCr_z$. MF is the manganese:iron+manganese ratio $x/[1-y-z]$. $\Delta Vol$ is the volume difference (range) calculated from the difference of Li:M and $PO_4:[(Li+M)/2]$ from the optimum values (P=1.095 and LM=0.980). For example, $\Delta Vol$ is 0.0255 for the preferred stoichiometry and 0.0126 for the more preferred stoichiometric region. The formula can also be written as:

$$Vol = 74.2148 \pm \Delta Vol - (3.8715*y) - (3.7694*z) + (3.0457*[(x/(1-y-z))-0.5])$$

Conclusion: Example 8 demonstrates that XRD can be used to understand if a preferred composition has been achieved. The unit cell values change in a systematic way as a function of composition, i.e. phosphor stoichiometry and lithium to metal ratio. The systematic change of lattice constant is evidence that the bulk of the LFMP allows for a non-stoichiometric composition which derives from the ideal stoichiometric with $PO_4:[(L+M)/2]=1$ and Li:M=1.

The invention claimed is:

1. An olivine cathode material comprising Li, M and $PO_4$, having a non-stoichiometric composition wherein:
   the phosphor stoichiometry $PO_4:[(Li+M)/2]$ is between 0.960 and 1.000,
   the lithium to metal ratio Li:M is between 1.040 and 1.150, and wherein $M=Fe_{1-x-z}Mn_xD_z$ with $0.10<x<0.90$, $z>0$, D being a dopant comprising one or both of Cr and Mg.

2. The olivine cathode material of claim 1, wherein the lithium to metal ratio Li:M is between 1.070 and 1.120.

3. The olivine cathode material of claim 1, wherein the manganese to iron ratio Mn/(Mn+Fe) is between 0.25 and 0.75.

4. The olivine cathode material of claim 1, wherein $z<0.05$.

5. The olivine cathode material of claim 4, wherein D comprises both Mg and Cr.

6. The olivine cathode material of claim 5, wherein $0.010<z<0.045$.

7. The olivine cathode material of claim 1, wherein the material is a single phase olivine.

8. The olivine cathode material of claim 1, wherein $M=Fe_{1-x-y-z}Mn_xMg_yCr_z$, and wherein the unit cell volume for one formula unit of olivine is given by the following equation and wherein the unit cell volume is expressed in $Å^3$:

$$Vol = 74.21478 \pm \Delta Vol - (3.87150*y) - (3.76943*z) + (3.04572*[x/(1-y-z)]-0.5],$$

with $\Delta Vol = 0.0255$.

9. The olivine cathode material of claim 1, wherein $M=Fe_{1-x-y-z}Mn_xMg_yCr_z$, and wherein the unit cell volume for one formula unit of olivine is given by the following equation and wherein the unit cell volume is expressed in $Å^3$:

$$Vol = 74.21478 \pm \Delta Vol - (3.87150*y) - (3.76943*z) + (3.04572*[x/(1-y-z))31\ 0.5],$$

with $\Delta Vol = 0.0126$.

10. The olivine cathode material of claim 1, having a BET surface area value $>30\ m^2/g$.

11. The olivine cathode material of claim 1, wherein D comprises Cr, and having a BET surface area value $>40\ m^2/g$.

* * * * *